Jan. 21, 1969 M. C. THOMAS 3,422,870
REMOTE CONTROLLED TRACTION DEVICE FOR MOUNTING
AND DEMOUNTING ON VEHICLE WHEELS
Filed April 20, 1966 Sheet 3 of 3

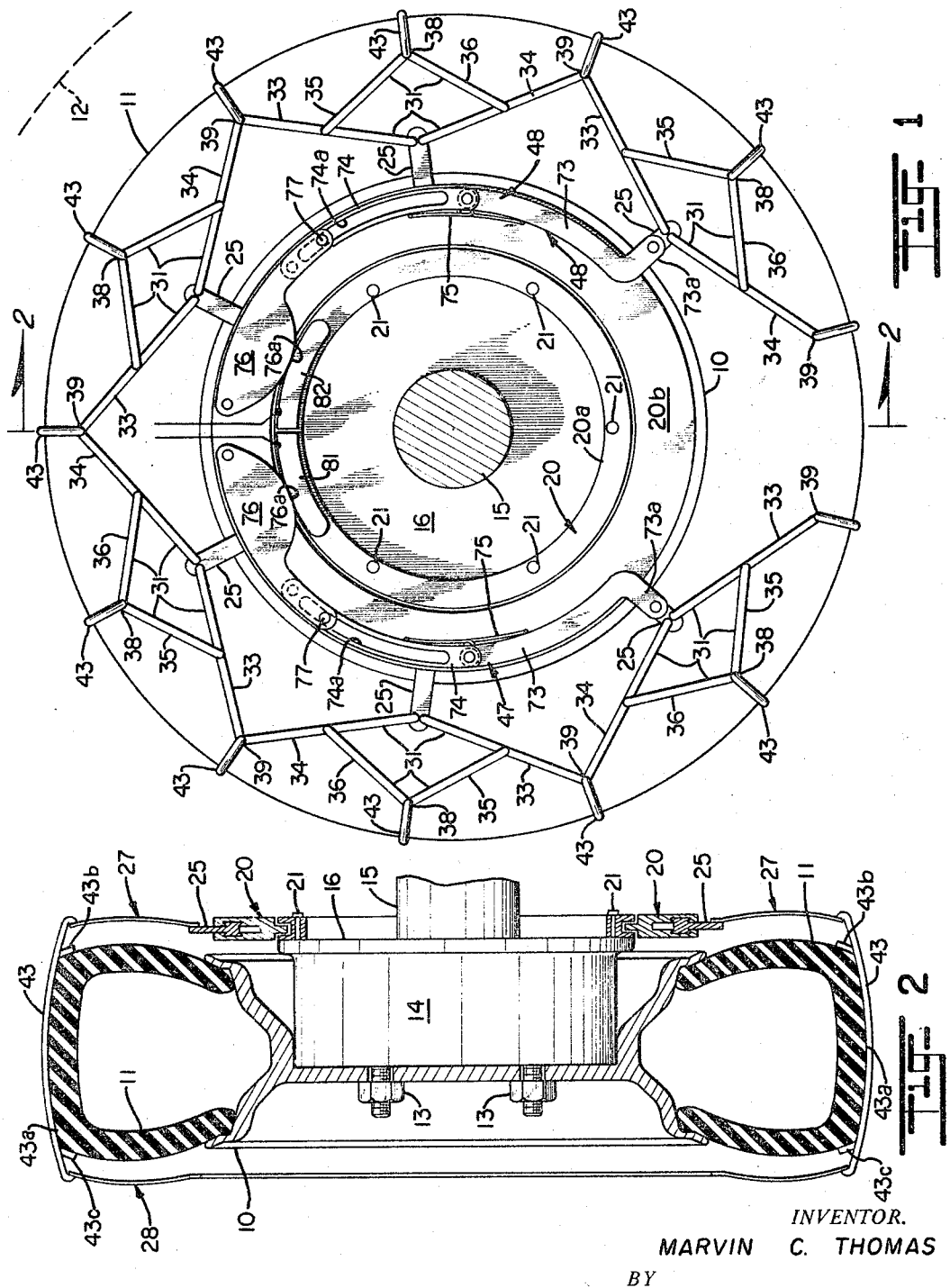

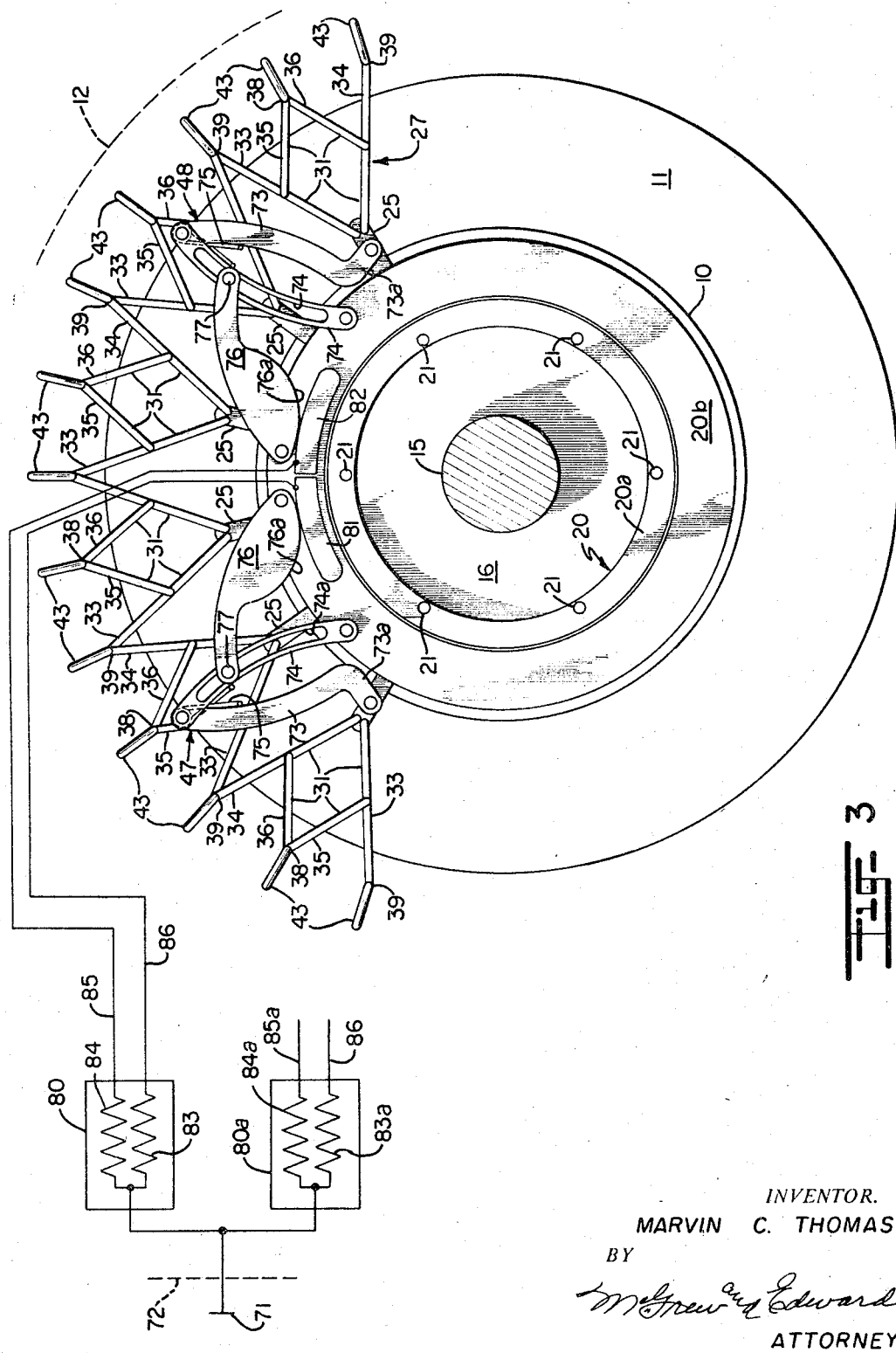

INVENTOR.
MARVIN C. THOMAS
BY
ATTORNEYS

United States Patent Office 3,422,870
Patented Jan. 21, 1969

3,422,870
REMOTE CONTROLLED TRACTION DEVICE FOR MOUNTING AND DEMOUNTING ON VEHICLE WHEELS
Marvin C. Thomas, 3460 Berkeley St., Boulder, Colo. 80302
Filed Apr. 20, 1966, Ser. No. 543,889
U.S. Cl. 152—214                  12 Claims
Int. Cl. B60c 27/14

ABSTRACT OF THE DISCLOSURE

Traction device for tire and wheel of vehicle having extensible assembly inclusive of plurality of links in pantograph assembly supporting traction members transversely of tread. Extensible assembly carried by stationary surface of vehicle inwardly of and out of contact with wheel in retracted inactive position. An actuating mechanism out of contact with wheel for extending said assembly into tire gripping relation to dispose traction members at circumferentially spaced intervals along tire tread. Resilient bias holding pantograph assembly in extended position.

---

This invention relates to motor vehicle accessories and more particularly to a traction device for motor vehicle wheels suitable for application to and retraction from the tire.

Roads over which motor vehicles travel are frequently snow or ice covered or in a muddy condition which make driving hazardous or difficult and some type of traction device on the wheels of the vehicle is required or desired to provide safe travel for the vehicle over such roads.

Various types of traction arrangements have heretofore been provided, such as chain assemblies and special tread configurations. Chain assemblies provide good traction characteristics for such hazardous road conditions but are inconvenient insofar as they must be manually installed on each wheel from outside the vehicle. These chain assemblies when not in use are completely detached from the vehicle and occupy part of the storage space of the vehicle so as to be accessible when needed. Such installation inconveniences frequently result in such chain assemblies being driven on the hardtop or concrete highways during conditions producing both wear to the highways and to the chain assemblies. Extended periods of such driving frequently cause the chains to break, which may result in damage to the vehicle, or result in loss of a chain assembly. More recently steel and ceramic cleats have been installed as an integral part of the tire tread. These tires provide improved traction over the previously used tread configurations but in many cases do not provide adequate traction.

Accordingly, it is an object of my invention to provide a novel traction device for motor vehicle wheels which has good traction qualities and may be conveniently and easily applied to and removed from selected vehicle wheels in what is essentially an automatic action.

Another object of my invention is to provide a novel traction device for motor vehicle wheels which is carried by the vehicle at all times and may be applied to and removed from selected tires as required from an operating position interiorly of the vehicle.

It is a further object of my invention to provide a novel traction device for motor vehicle wheels which may be applied to the wheels only when road conditions so require and may be removed from the vehicle easily and almost instantaneously when no longer needed so as to prevent excessive wear of both the device and highways when the road conditions do not require a traction device.

Other objects, advantages and capabilities of the invention will become apparent from the following description taken in conjunction with the accompanying drawings showing only a preferred embodiment of the invention.

FIG. 1 is a side elevation view of a traction device for a motor vehicle wheel embodying my invention shown in the extended position seated on the tire tread for conjoint rotation with the wheel and viewed from the inner side of the wheel;

FIG. 2 is a sectional view taken along line 2—2 of FIG. 1 with the control mechanism, leverage assemblies and cam arms removed to better illustrate the mounting arrangement;

FIG. 3 is a side elevation view of the traction device shown in FIG. 1 in the retracted position in which the traction members are spaced from the tread surface of the wheel and with a control mechanism embodying my invention represented schematically as being installed on the dashboard of the vehicle;

Figure 5:
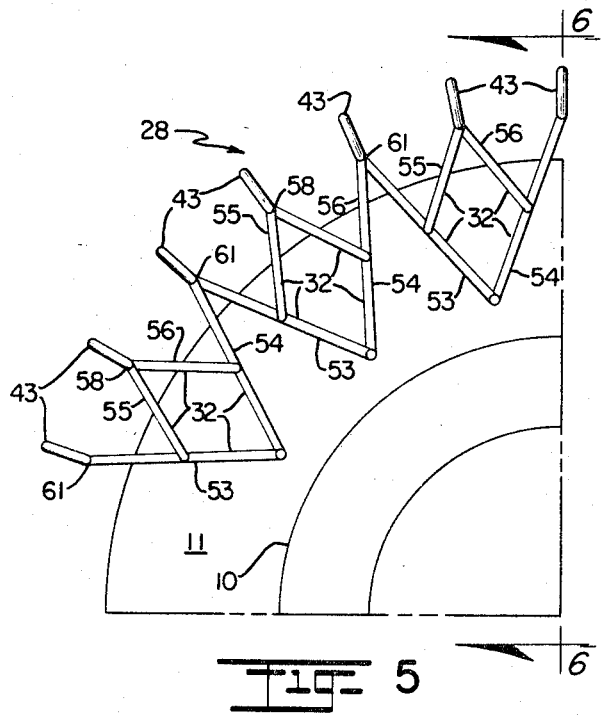
FIG. 5 is a partial side elevational view showing the traction members in the retracted inactive position above the tire surface as viewed from the outer side of the wheel.

Referring now to the drawings, there is shown in FIG. 2 a self-propelled vehicle wheel 10 having a tire 11 mounted thereon and disposed in spaced relation to the overhanging fender 12 of the vehicle (not shown). The wheel is illustrated as detachably bolted by bolts 13 to a brake drum assembly 14 mounted on the housed axle 15 and rotatable about the axis of rotation of the axle with respect to a stationary backing plate 16 adjacent thereto which is conventional structure in most self-propellel vehicles. While the traction device is hereinafter described as supported from the stationary backing plate 16, it is understood that various other stationary surfaces of the vehicle also may be utilized such as the axle housing, frame, shock brackets and the like. Although the vehicle is illustrated in FIG. 3 as of the type having an overhanging fender 12 in close proximity to the tire as is conventional in automobile applications, it is also understood this traction device is suitable for installation on any type of self-propelled vehicle whether having a fender in substantially spaced relationship to the tire or no fender at all.

Figure 4:
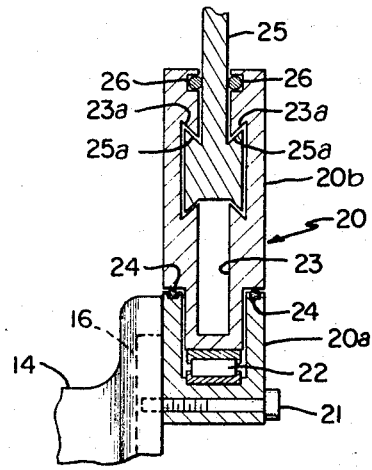
FIG. 4 is an enlarged sectional view of the base member and support member shown in FIG. 1 illustrating particularly the bearing and sealing of moving surfaces from exterior foreign matter.

A traction device embodying my invention for use in combination with the above described conventional tire-mounted vehicle wheel comprises a circular base member 20 including an annular stationary portion 20a (FIG. 4) attached by circumferentially disposed bolts 21 or the like to the backing plate 16 and encompassing the housed axle 15 in substantially spaced relationship. This base member 20 also includes a movable portion 20b surrounding the stationary portion, fitted therein spaced relation thereto, and rotatably supported thereon by bearings 22 which extend circumferentially of the stationary portion 20a. The interior bearing 22 is sealed by sealing members 24 which may be of various types and shown in the form of O-rings disposed in compressed relationship between adjoining surfaces of portions 20a and 20b and extending circumferentially of the base member to seal the bearing from outside elements such as water, sand, dirt, and the like. Lubrication of the bearings 22 may be provided by having permanently lubricated bearings or by "Zerk" fittings attached to the stationary portion 20a.

The movable portion 20b includes an annular recess 23 extending from its periphery inwardly thereof having flanged surfaces 23a concentric with respect to the axis of rotation of the wheel. A plurality of radially extending support members 25 having one flanged end are slidably supported and secured in the annular recess 23 for circumferential movement therein as hereinafter described. These support members 25 may be slidably held in the annular recess 23 in various ways, as for example by providing flange surfaces 25a which mate and are held by flange surface 23a as shown. The interior surfaces 23a and 25a are sealed by sealing members 26 which may be of various types and shown in section in the form of O-ring portions disposed in compressed relationship between the inner recess walls and the outer surfaces of support member 25 at the outer periphery of the base member and having accordion-like portions (not shown) between adjoining support members 25 to seal the surfaces 23a and 25a from outside elements such as water, sand, dirt and the like.

It will be understood that support members 25 may be slidably supported on the backing plate for circumferential movement in the manner hereinafter described in other ways than in an interior recess as shown. The rotatable support members may be confined within a recess or slot on the exterior surface formed as a part of the plate or as a detachable member easily attached to a conventional backing plate of the vehicle.

The upper ends of the support members 25 are joined to what will hereinafter be generally referred to as an extensible assembly illustrated in the form of pantograph assemblies 27 and 28 disposed adjacent the inner and outer side walls of the tire, respectively, and arranged for extension and retraction movement adjacent the inner and outer surfaces of the tire 11. Pantograph assemblies 27 and 28 as shown in the drawings comprise a plurality of similar pantograph units 31 on the interior side of the tire, each directly connected to one of the support members 25, and a corresponding plurality of similar pantograph units 32 (FIG. 5) on the exterior side of the tire are joined by tire engaging surface traction members 43 extending transverse of the tire tread which are moved between a tire gripping position and an elevated position above the tire by the extensible assembly as hereinafter described.

Each inner pantograph unit 31 (FIGS. 1 and 3) includes a pair of base links 33 and 34 jointed or pivotally attached at one end to the outer end of one of the support members 25 and a pair of intermediate links 35 and 36 jointed or pivotally attached at one end centrally of the base links 33 and 34, respectively. The other ends of the intermediate links are jointed or pivotally attached by a suitable connecting member 38 to the inner end of the traction member 43 in a manner which permits a pivotal relationship between the adjacent ends of base links 33 and 34 and the inner end of traction member 43 and easy removal of traction member 43 to replace worn traction members and to substitute traction members suitable for different road conditions.

Each pantograph unit 31 is joined to form the composite pantograph assembly 27 spanning the inner side wall of the tire in the extended position as shown in FIG. 1 by jointing or pivotally connecting the adjoining base links 33 and 34 with an inner end of another traction member 43 by a connection member 39 similar to connection member 38 as above described.

Figure 6:
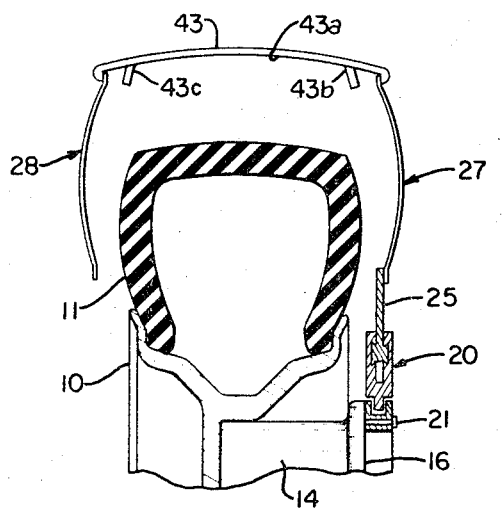
FIG. 6 is a sectional view taken along lines 6—6 of FIG. 5.

Pantograph units 32 are disposed on the exterior side of the tire as shown in FIG. 5 and includes base links 53 and 54 and intermediate links 55 and 56 which are joined in a pantograph configuration oppositely of links 33, 34, 35 and 36, respectively, of pantograph unit 31 as above described. The corresponding and opposite links of units 31 and 32 are of equal size and dimension and equivalently joined to the outer ends of tread members 43 by connecting members 58 and 61 for conjointly extending and retracting tread members 43 attached to the inner ends of units 31 as above described. The inner ends of the base links 53 and 54 of units 32 differ from those of units 31 in that they are commonly connected and have no equivalent support members 25 on the exterior of the tire. The links of assemblies 27 and 28 and the upper portion of support members are shaped or formed to conform with the curvature of the tire and are disposed in substantial spaced relation thereto in both the extended and retracted positions as shown in FIGS. 2 and 6.

The ends of each pantograph assembly 27 and 28 terminate in adjoining end base links 33 and 34 and 53 and 54 which are simultaneously pulled from opposite directions by the end support members 25. Various means may be provided for pulling and returning the tread members 43 from the extended position to the retracted position from a point centrally of the tread members such as by direct linkage from end support member 25 to the end tread member 43 or a plurality of the tread members 43 such as those spanned by the end units 31 and 32.

The plurality of tire engaging surface traction members 43 which are pivotally supported by the pantograph assemblies 27 and 28 provide a gripping surface with the tire 11 and provide traction surfaces between the tire and the ground on which the tire is supported. Each of these tire engaging members 43 includes cross member portions 43a arranged to seat on the tread surface of the tire and inner and outer depending portions 43b and 43c at opposite ends which grip the tread and upper side surfaces respectively of the tire in the applied or extended position as shown in FIGS. 1 and 2.

Application and retraction of the traction members 43 from the tire surfaces is generally carried out through movement of the pantograph assemblies 27 and 28 and attached support members 25 by a pair of identical opposing cam-actuated leverage assemblies 47 and 48 joined to oppoiste ends of the pantograph assemblies 27 and 28. These leverage assemblies are remotely controlled by a control lever 71 preferably mounted on the dashboard 72 within the vehicle (FIG. 3).

Each leverage assembly includes an outer arm 73 of generally arcuate configuration having an end portion 73a depending at right angles with its arcuate portion. The depending end portion 73a of each outer arm is pivotally joined to respective outermost support members 25 which are attached to the ends of the pantograph assemblies 27 and 28 so as to join the control mechanism to opposite ends of the pantograph assemblies to extend and retract the traction members 43 by applying forces thereto.

An intermediate arm 74 having a slotted portion 74a extending lengthwise thereof is pivotally joined to the other end of each of the respective outer arms 73 oppositely of their connections with the respective outermost support members 25. The other end of each of the intermediate arms 74 is pivotally joined to the movable portion 20b so as to dispose arms 73 and 74 in a generally arcuate pattern conforming with the curvatures of the base member 20 and disposed inwardly of the outer surface of the movable portion 20b when in the extended position shown in FIG. 1. A biasing member or tension spring 75 is secured at the pivotal joint of each of arms 73 and 74 and extends a substantial distance along the arms terminating in a connection therewith so as to bias or hold the arms in the extended position.

Each lever assembly is moved by actuation of a cam arm 76 pivotally secured at adjoining ends on the movable portion 20b to pivot outwardly and having a pin 77 at the free end fitted in respective slots 74a for slidable movement and so that outward pivotal movement of each cam will slide the pins 77 in their respective slots 74a to raise the arms 73 and 74 against pressure of the bias spring 75 to an upper retracted position shown in FIGS. 3 and 5. Each cam arm 76 has lower cam surfaces 76a. With this arrangement the outermost end support members 25 are pulled from opposite ends from the extended to the retracted position by force applied against the respective cam arms 76 in an upward direction.

Various cam arrangements may be provided for simultaneously and independently raising the opposing cam arms 76. There is shown a pair of cam members 81 and 82 which are moved from a lower position to an upper position to raise the cam arms 76 of the respective lever assemblies 47 and 48 and release the lever assemblies under control of the spring members 75. It is understood that the leverage assemblies 47 and 48 as arranged may be biased or normally held in the extended position in various ways such as by biasing between a point on the movable portion 20b and end support members 25, or by biasing the respective cams 76 in a normally down position as shown in FIG. 1 or the like.

In the operator control system shown in FIG. 3, a control box 80 is connected between the control lever 71 at the dash 72 and the two cam members 81 and 82 by a suitable cable or the like. Control box 80 has tension members 83 and 84 independently connected by cables 85 and 86 to each cam member 82 and 81, respectively, such that when the control lever 71 is moved by the operator to the "retract" position an equal amount of upwardly pulling force is independently applied to each cam member 81 and 82. Multiple wheels may be similarly controlled by means of additional control boxes illustrated as box 80a and cable connected in parallel with the control lever 71. Box 80a includes tension members 83a and 84a which pull and release cables 86a and 85a, respectively, to independently control cam members on another vehicle wheel (not shown). For a four-wheel drive, it is apparent that two additional control boxes can be included in a similar parallel arrangement with the control lever 71 for simultaneous and independent actuation of the cam members of each wheel.

In operation, it will first be assumed that the traction device is being carried in the retracted position as shown in FIG. 3 in which the tire-engaging traction members 43 are supported by the pantograph assemblies 27 and 28 and support members 25 in a spaced relationship with the top and sides of the tire 11 and also spaced from fender 12. In this position, both the stationary portion 20a and the movable portion 20b of the base member 20 are in a stationary condition.

Assuming that road conditions require the application of the traction members 43 to the tire 11, control lever 71 is actuated by the operator within the vehicle while the vehicle is moving slowly so that the cam members 81 and 82 are moved to a down position (FIG. 1). The lever assemblies 47 and 48 being under tension of springs 75 move from the position shown in FIG. 3 to the position shown in FIG. 1 with the pantograph assemblies 27 and 28 extending the tire engaging members 43 to the position shown by FIG. 1 with simultaneous movement by each side lever assembly 47 and 48. In the tire engaging position as shown in FIG. 1, the movable portion 20b will then rotate on the bearings 22 conjointly with the tire 11.

In the event that the road conditions do no longer require traction members on the tire 11, the cam members 81 and 82 are simultaneously pulled upwardly through control box 80 by the control lever 71 on the dash to engage the cam surfaces 76a and simultaneously pull the cam arms 76 upwardly and the leading end support members 25 in the flanged slot recess 23 from the extended to the retracted position as shown in FIGS. 3 and 5. This removal from the tire operation is accomplished when the vehicle is rolling at slow speeds such that application of an upward force on the cam surfaces 76a will pull on the support members 25 which will release the pantograph assembly on each end during a particular portion of the cycle of revolution when its end traction members are not between the tire and the ground.

The pantograph assembly once actuated by pull from one side or the other almost immediately moves the traction members away from the tire and its movement from the extended to the retracted position. In the event of a collapse of the tire 11 when the traction device as above described is applied to the tire, various release means may be provided for collapsing the assembly to avoid permanent deformation or breakage. For example, selected links may be spring slotted to decrease in length in the event the tire deflates. In addition, support members 25 may be constructed or jointed to collapse when forces resulting from a flat tire are suddenly applied to these members.

The traction device as above described embodying my invention is adaptable for all types of application requirements and once installed, whether as original equipment or as an accessory on an older vehicle, will not interfere with the normal use and functioning of the vehicle. This device may be applied by simply turning a vehicle out of the regular path of traffic on a highway, reducing the vehicle speed and then actuating the control mechanism from within the vehicle. It is apparent also that this device having equal pulling forces on each side of the wheel, may be applied while the vehicle is moving forward or in reverse.

While I have particularly shown and described one particular embodiment of the invention, it is distinctly understood that the invention is not limited thereto but that modifications may be made within the scope of the invention.

I claim:

1. A traction device for motor vehicle wheels having overhanging fenders and a brake drum assembly for the wheel, inclusive of a stationary backing plate, comprising base means defining a flanged annular recess carried by the backing plate concentric with the axis of rotation of the wheel, a plurality of support members confined at one end within the recess and having the remaining portion extending radially in spaced relation to the backing plate and terminating in a connection with a portion of an arcuate assembly arranged for extension and retraction movements adjacent the surface of a tire mounted on the wheel, tire-engaging traction members carried by the assembly at intervals throughout its length, including cross portions adapted to seat on the tread surface of the tire in the extended position of the assembly and to move away from the tire in the retracted position of the assembly, and control means remote from the wheel for initiating movement of one end of the assembly so as to bring one cross portion at said end into seated position on the tread surface of the tire followed by a progressive seating of the other cross portions of the assembly during continued slow rotation of the wheel and before resuming normal vehicle speed.

2. A traction device as set forth in claim 1 wherein said arcuate assembly is arranged in the form of a continuous pantograph.

3. A traction device as set forth in claim 1 wherein said base means includes a stationary portion attached to the backing plate and a movable portion having said flanged recess and movable with said wheel when said cross portions are seated on the tread surface in the extended position.

4. A traction device as set forth in claim 3 wherein said movable member is supported on bearing surfaces attached to the stationary portion.

5. A traction device as set forth in claim 1 wherein said cross portions contact on the sides of the vehicle tire.

6. A traction device for tire-mounted wheels having a stationary backing plate, comprising base means inclusive of a movable portion defining a flanged annular recess concentric with the axis of rotation of the wheel and a stationary portion attached to the backing plate, a plurality of support members confined at one end within the recess and having the remaining portion extending radially in spaced relation to the backing plate and terminating in a connection with an arcuate assembly arranged for extension and retraction movements adjacent the surface of a tire mounted on the wheel, tire-engaging traction members carried by the assembly at intervals throughout its length, including cross portions adapted to seat on the tread surface of the tire in the extended position of the assembly and to move away from the tire in the retracted position of the assembly, leverage means supported on said movable portion and joined to at least two of said support members and attached at opposite ends of said assembly and having biasing means to hold said traction members in said extended tire-engaging position, camming means controlled remotely of said wheel for selectively moving said leverage means against the force of said biasing means for applying pulling forces at opposite ends of said assembly through said leverage means to move said traction members to the retracted position during rotation of the wheel and for releasing said leverage means under the force of said biasing means for initiating movement at opposite ends of said assembly so as to return the assembly and traction members to the extended position during rotation of the wheel before resuming normal vehicle speed.

7. A traction device as set forth in claim 6, wherein said arcuate assembly encompasses a portion of both sides of said tire.

8. The combination with at least one of the wheels of a self-propelled vehicle having an overhanging structure shielding an upper portion of the wheel in spaced relation thereto, of an extensible assembly having a plurality of circumferentially disposed traction members, means for supporting said extensible assembly from a stationary surface of the vehicle inwardly of the wheel in a retracted inactive position having the traction members in partially encompassing and in spaced relation to the tire, said support means including a base member having a stationary portion adapted for mounting on the stationary surface of the vehicle and a movable portion supported for movement about the axis of the associated wheel in a bearing disposed on said stationary portion and a support portion slidably movable about said axis in said movable portion and interconnected with the extensible assembly, and an actuating mechanism for extending said assembly into tire gripping relation susbtantially encompassing the tread surface with slidable movement of said support portion so as to dispose the traction members at circumferentially spaced intervals along the tire tread for conjoint rotation of the traction devices and said movable portion on said bearing when the tire resumes regular speed.

9. The combination as set forth in claim 8 wherein said means for extending said assembly is operative from interiorly of the vehicle.

10. The combination as set forth in claim 8 wherein said extensible assembly is moved by applying independent forces to opposite ends thereof.

11. A traction device as set forth in claim 8 wherein said cross members are detachable from the assembly.

12. A traction device for mounting on a tire-mounted wheel of a self-propellel vehicle when extended for conjoint rotation therewith, and device comprising an extensible assembly inclusive of a plurality of pivotal link members joined in a pantograph assembly adjacent the tire, and traction means extending transversely of the tire tread, means for supporting said extensible assembly from a stationary surface of the vehicle inwardly of the wheel in spaced relation thereto, resilient biasing means for normally holding said pantograph assembly in the extended position on said support means so as to dispose the surfaces of the traction means at approximately equally spaced intervals throughout the circumference of the tire, said support means including a base member having a stationary portion adapted for mounting on the stationary surface of the vehicle and a movable portion supported for movement about the axis of the associated wheel in a bearing disposed on said stationary portion and a support portion slidably movable about said axis in said movable portion and interconnected with the pantograph assembly, and an actuating mechanism for extending said assembly into tire gripping relation substantially encompassing the tread surface with slidable movement of said support portion so as to dispose the traction members at circumferentially spaced intervals along the tire tread for conjoint rotation of the traction devices and said movable portion on said bearing with the tire.

References Cited

UNITED STATES PATENTS 2,581,770   1/1952   Pittinger _____ 152—216

ARTHUR L. LA POINT, *Primary Examiner.*

C. B. LYON, *Assistant Examiner.*